United States Patent [19]
Simpson

[11] Patent Number: 5,606,132
[45] Date of Patent: Feb. 25, 1997

[54] STRAIN INDICATOR USING AN OPTICAL INDICATOR MEANS

[76] Inventor: Neil A. A. Simpson, Burn of Daff Farm, Downies, Portlehen, Aberdeen AB1 4QX, Great Britain

[21] Appl. No.: 431,912

[22] Filed: Apr. 28, 1995

[30] Foreign Application Priority Data

Apr. 29, 1994 [GB] United Kingdom ............... 9408536

[51] Int. Cl.⁶ ............................................ G01L 1/24
[52] U.S. Cl. ................................ 73/800; 73/768
[58] Field of Search .................... 73/762, 768, 800, 73/824, 849

[56] References Cited

U.S. PATENT DOCUMENTS

| | | | |
|---|---|---|---|
| 2,600,029 | 6/1952 | Stone | 73/768 |
| 2,873,341 | 2/1959 | Kutsay | 73/768 |
| 3,964,299 | 6/1976 | Johnson | 73/762 |
| 4,041,776 | 4/1977 | Payne | 73/800 |
| 4,549,175 | 10/1985 | Rokunohe et al. | 340/794 |
| 5,284,062 | 2/1994 | Ryffle | 73/768 |

FOREIGN PATENT DOCUMENTS

| | | |
|---|---|---|
| 972595 | 6/1963 | United Kingdom . |
| 2195459 | 7/1988 | United Kingdom . |

*Primary Examiner*—Hezron E. Williams
*Assistant Examiner*—Max H. Noori
*Attorney, Agent, or Firm*—Ratner & Prestia

[57] ABSTRACT

A strain indicator of the type wherein a change in length of the strain indicator gives a visual indication of the change in length. The strain indicator has an elongate strip supported at either end such that the curvature of the strip changes with changes in strain. An optical indicator such as a reflector is mounted on the strip so that the change in curvature can be measured.

25 Claims, 6 Drawing Sheets

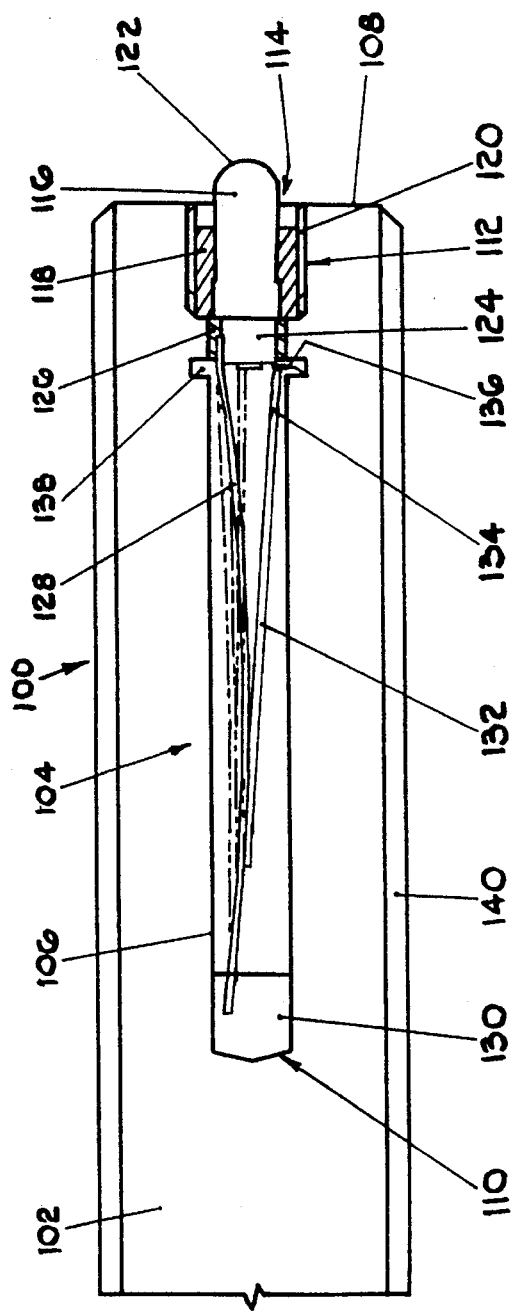
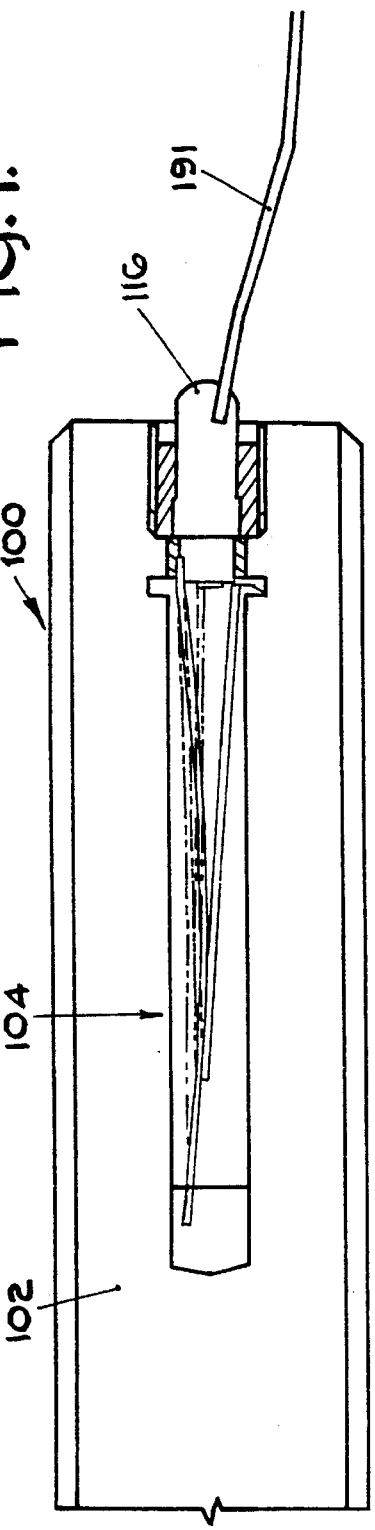

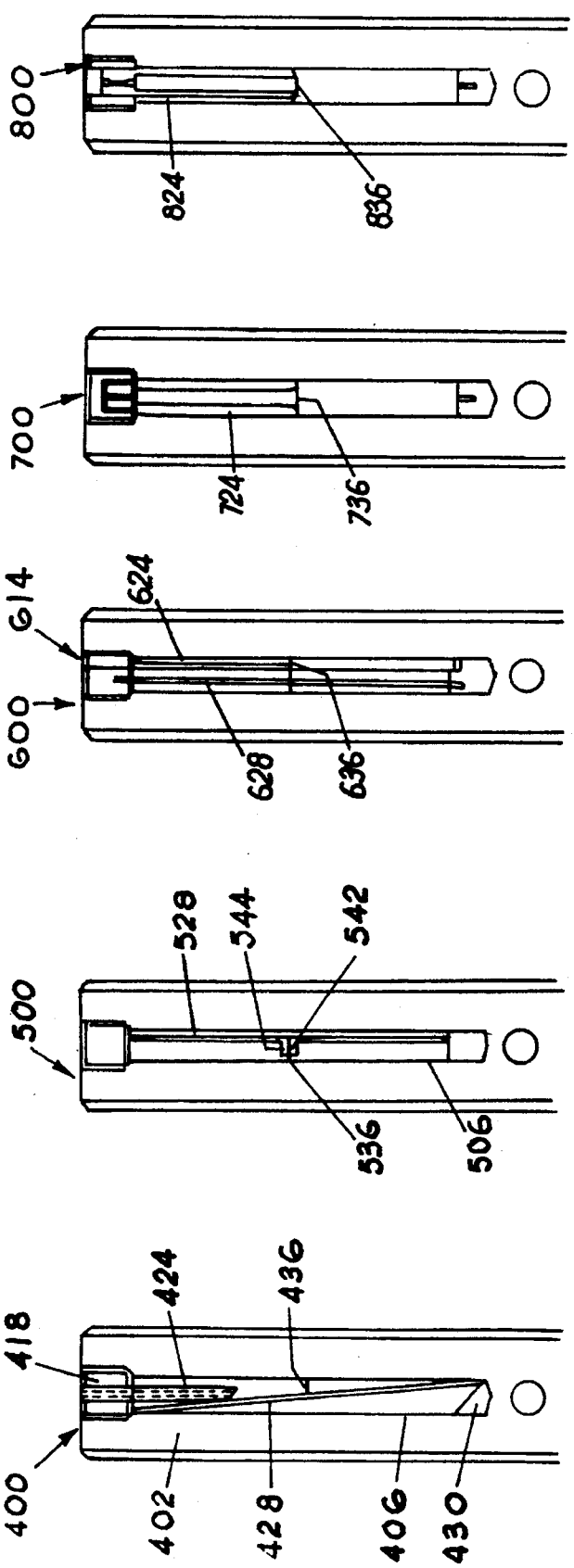

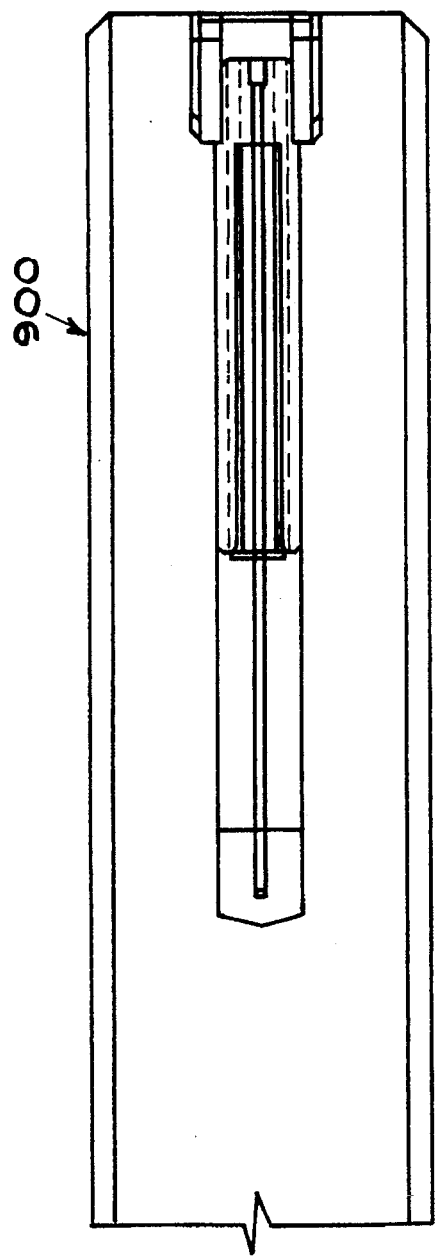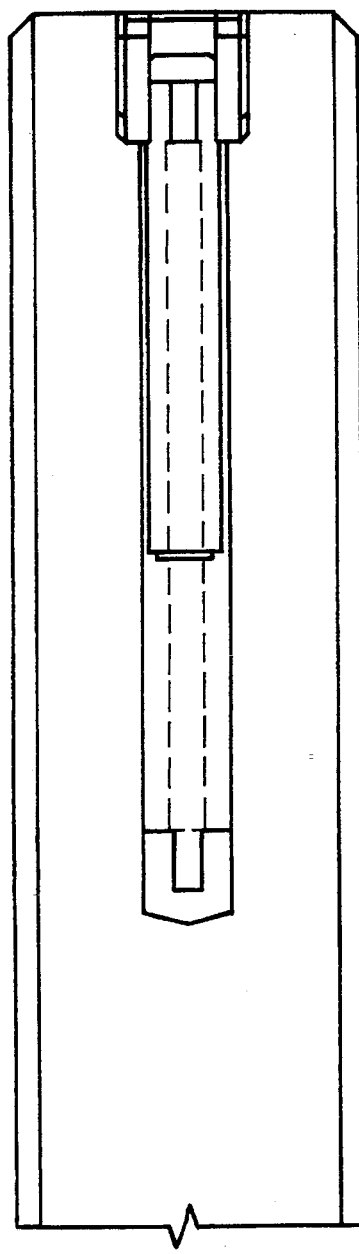

STRAIN INDICATOR USING AN OPTICAL INDICATOR MEANS

This invention relates to a strain indicator, and relates more particularly but not exclusively to a strain indicator for indicating the elongation of a fastener operating under tension.

It is common for a vessel holding fluid at high pressure (eg a valve or turbine casing) to be sealed by a closure retained by means of a peripheral array of screw-threaded fasteners, usually studs (with fitted nuts) or bolts. The integrity and safety of the sealing depends upon each fastener being tightened by a precise extent, and upon such tightness being maintained, possibly against widely fluctuating stresses and temperatures. Creep and corrosion can also affect fastener tightness in the longer term.

It is desirable to be able to check fastener tightness both at the time of initial tightening, and also subsequently. Remote monitoring of a fastener may be desirable or essential, particularly if access to the fastener is difficult or dangerous. It is important that any arrangement for monitoring fastener tightness should be reliable, and preferably of minimal cost.

Numerous proposals have been made for monitoring fastener tightness, but these generally have one or more substantive disadvantages, such as inability to detect slackening of the fastener, excessive complexity and/or cost, unreliability, unadaptability to remote monitoring, and susceptibility to interference.

It is recognised that the axial elongation of a fastener is a valid indication of its tensile loading. In order to monitor variations in the length of a fastener (such variations being very small relative to the overall length of a fastener) it is known to form a bore extending from one end of the fastener, and part-way along the axis of the fastener, a length-sensitive device being fitted in the bore to monitor elongation (ie axial strain) of the fastener. A known sample of such an arrangement is described in Federal German Offenlegungsschrift DE 3523638-A1. However, the strain-measuring device in DE 3523638-A1 is a strain gauge delivering an electrical signal which is susceptible to electrical interference, particularly in the environment of a large electrical machine as is proposed by DE 3523638-A1.

According to a first aspect of the present invention there is provided a strain indicator for incorporation between a first abutment means and a second abutment means to indicate variations in the mutual separation of said first and said second abutment means, said strain indicator comprising an elongate member having opposite ends adapted to be lodged respectively against said first and second abutment means, said elongate member being deformable in a substantially elastic manner by longitudinal compression applied between said opposite ends, said elongate member being deformed in use by such longitudinal compression thereof to vary the curvature thereof between said opposite ends, said elongate member carrying optical indicator means to vary the position and/or alignment thereof substantially in accordance with the variation of said curvature of said elongate member whereby variations in the position and/or alignment of said optical indicator means during use of said strain indicator optically indicate variations in the curvature of said elongate member consequent upon variations in the longitudinal compression thereof induced by variations in said mutual separation of said first and second abutment means.

Said elongate member is preferably in the form of a scrip which may have a width which is substantially greater than its thickness whereby to cause said strip preferentially to bend in a plane including said opposite ends and orthogonal to said width. Either or both of said width and said thickness may be substantially uniform along the length of said strip; alternatively one or both of said width and said thickness may vary in a predetermined manner along the length of said strip. Said strip is preferably formed of tempered steel or other material with the same or similar coefficient of thermal expansion to the fastener/bolt or stud material.

Said optical indicator means preferably comprises reflector means which is visibly calibrated and/or has other means of optically distinguishing different parts of said reflector means, for example differently coloured reflection zones.

Said optical indicator means may be mounted directly on said elongate member, but said optical indicator means is preferably mounted on the free end of a cantilever member whose anchored end is anchored to said elongate member to be moved thereby with changing curvature thereof. Said anchored end of said cantilever member is preferably anchored to said elongate member to lie substantially tangential thereto at a region thereof which undergoes maximal change in directional alignment with changes in curvature of said elongate member, said region being (for example) at or close to one end of said elongated member.

According to a second aspect of the present invention there is provided an assembly of an article and a strain indicator, said article comprising a first abutment means and a second abutment means which are mutually spaced apart on said article in a direction thereon which includes at least a component of a load to which the article is subjected in use thereof, which said load strains said article and induces variations in the mutual separation of said first and second abutment means in dependence upon the magnitude of the component of said load acting in said direction, said strain indicator being a strain indicator in accordance with the first aspect of the present invention and comprising an elongate member as defined by said first aspect, together with optical indicator means carried thereby as also defined by said first aspect, said elongate member having the opposite ends thereof lodged respectively against said first and second abutment means in a manner inducing a longitudinal pre-compression in said elongate member and a corresponding pre-curvature of said elongate member, whereby an increase in tension or a decrease in compression exerted by said component of said load on said article increases the mutual separation of said first and second abutment means and correspondingly decreases the curvature of said elongate member to cause said optical indicator means optically to indicate such decrease in curvature of said elongate member, and a decrease in tension or an increase in compression exerted by said component of said load on said article decreases the mutual separation of said first and second abutment means and correspondingly increases the curvature of said elongate member to cause said optical indicator means optically to indicate such increase in curvature of said elongate member.

At least one of said first and second abutment means may comprise a controllably variable mounting means which is adapted to mount one end of said elongate member and is operable to apply a controllably variable precompression to said elongate member. Said controllably variable mounting means may comprise an adjustable clamping screw.

At least one of said first and second abutment means may comprise optical viewing means disposed and arranged to view said optical indicator means. Said optical indicator viewing means may comprise window means constituting a porthole optically linking the interior of said assembly and the exterior of said assembly, said window means preferably being constituted to magnify the view of said optical indicator means. In the case where said optical viewing means is not adjacent said optical indicator means, said optical viewing means preferably comprises optical image transfer means disposed and arranged to transfer the optical image of said optical indicator means to the exterior of said assembly. Said optical image transfer means may comprise an optical fibre extending from said optical viewing means to a location adjacent said optical indicator means.

Said article may be a fastener, which may be an externally screw-threaded stud or an externally screw-threaded bolt. Said fastener is preferably formed with a longitudinal bore extending from one end of said fastener at least part-way along said fastener. Said longitudinal bore is preferably substantially coaxial with said fastener, and is preferably closed at one end, either by forming the bore with a length less than the length of the fastener, or by forming an end-to-end through bore and subsequently closing one end thereof. The closed end of said bore preferably constitutes said first abutment means.

Said second abutment means is preferably constituted by a closure means for the open end of said bore, such closure means preferably comprising an axially mobile mounting for the proximate end of said elongate member, and an externally screw-threaded ring nut turnable in a correspondingly internally threaded end portion of said bore to adjust the longitudinal position of said ring nut, said ring nut normally abutting said axially mobile mounting whereby turning of said ring nut varies the axial position of said mounting and hence varies the precompression of said elongate member of said strain indicator.

Said ring nut preferably centrally mounts a window which may be of transparent glass or transparent acrylic plastics, and is preferably formed with an exterior surface shaped as a magnifying lens.

According to a third aspect of the present invention there is provided a strain monitoring system for centrally monitoring the respective strains of a spatially distributed plurality of articles each fitted with a respective strain indicator, each said article and its respective strain indicator constituting an assembly in accordance with the second aspect of the present invention, said strain monitoring system comprising a respective optical fibre extending from each said strain indicator to a central strain monitoring means to convey the optical image of the respective optical indicator of each said strain indicator to said central strain monitoring means.

Embodiments of the invention will now be described by way of example, with reference to the accompanying drawings wherein:

FIG. 1 is a longitudinal sectional elevation of a first embodiment of an assembly of a screw-threaded stud and a strain indicator;

FIG. 2 is a longitudinal sectional elevation of a second embodiment of an assembly of a screw-threaded stud and a strain indicator;

FIGS. 4–8 are simplified longitudinal sectional elevations of five further embodiments of an assembly of a screw-threaded stud and a strain indicator;

FIGS. 9 and 10 are respectively a longitudinal sectional elevation and a longitudinal sectional plan of an eighth embodiment of an assembly of a screw-threaded stud and a strain indicator;

Figure 3:
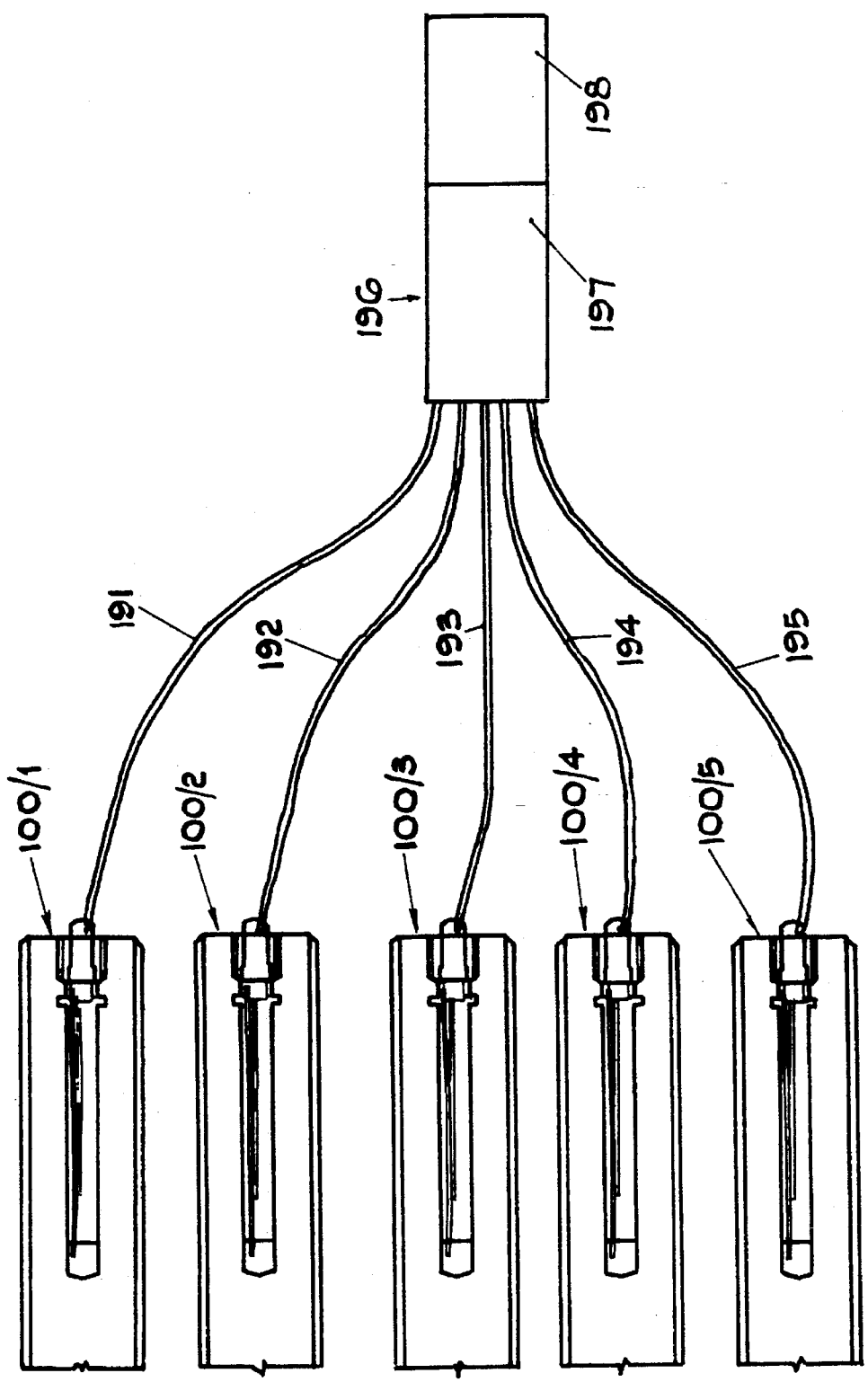
FIG. 3 is a schematic diagram of a first embodiment of strain monitoring system.

Referring first to FIG. 1, this depicts a first embodiment 100 of an assembly of an externally screw-threaded stud 102 and a strain indicator 104.

The strain indicator 104 is mounted principally within a longitudinal bore 106 extending coaxially along the stud 102 from its outer end 108 to a blind inner end 110 somewhat down the length of the stud 102. The outer end 112 of the bore 106, is the end of the bore 106 adjacent the outer end 108 of the stud 102, is fitted with a closure assembly 114 comprising a window element 116 retained by a ring nut 118 screw-threaded into a screw-thread 120 formed in the outer end 112 of the bore 106.

The window element 116 is formed of an optically transparent material, for example a glass or an acrylic plastics material. The outer end 122 of the window element 116 is domed to serve as a magnifying lens. The inner end 124 of the window element 116 is of a reduced diameter and circumscribed by a metal ring 126 for a purpose detailed below.

The strain indicator 104 comprises an elongated strip 128 formed of spring steel or any other suitable material capable of being elastically deformed by a longitudinal compression applied to the opposite ends of the strip 128. One end of the strip 128 is mounted in a plug 130 lodged in the inner end 110 of the bore 106, while the other end of the strip 128 is mounted in a notch inside the ring 126 at the outer end 112 of the bore 106.

The strip 128 initially has a shallow curvature shown in chain-dash outline in FIG. 1, but is subsequently elastically deformed to the curvature shown in full lines, as detailed below.

Near the inner end of the strip 128, one end of a rigid stem 132 is locally secured face-to-face with the strip 128 by any suitable means, for example by means of an adhesive, one or more rivets, or by spot welding. Other than for the end secured to the strip 128, the stem 132 is free of attachment to the strip 128 and being rigid, the stem 132 takes up an alignment which is tangential to the (curved) strip 128 at their point of mutual attachment. This tangency results in the free outer end 134 of the stem 132 being initially near the centre-line of the bore 106 as shown in chain-dash lines, and subsequently being displaced to one side of the bore 106 as detailed below.

The outer end 134 of the stem 132 carries a small reflector 136 which can be viewed through the window element 116 to determine the position of the outer end 134 of the stem 132 with respect to the centre-line of the bore 106. The reflector 136 can be visibly calibrated, and/or different regions of the reflector 136 can be colour-coded to facilitate position determination by an observer looking through the window element 116.

As previously mentioned, when initially installed and mounted as aforesaid, the strip 128 has the relatively shallow curvature shown in chain-dash lines, with the consequence that the free end 134 of the stem 132, and the reflector 136 carried thereby, are positioned approximately on the centre-line of the bore 106 and substantially centrally of the inner end 124 of the window element 116. To complete the installation procedure and setting-up of the strain indicator 104, the ring nut 118 is turned in the screw-thread 120 to force the ring 126 axially inwards by a small amount from the outer end 112 of the bore 106. This adjustment (rotation of the ring nut 118 and axial movement of the strip mounting constituted by the ring 126) induces a precompression of the spring strip 128, the compressive force resulting from axially inward movement of the mounting ring 126 being reacted by the plug 130 fixedly lodged against the inner end 110 of the bore 106. The precompression of the spring strip 128 results in an increase in the curvature of the strip 128, from the relatively shallow curvature shown in chain-dash lines in FIG. 1 to the relatively deep curvature shown in full lines in FIG. 1. This increase in curvature of the strip 128 in turn results in the free end 134 of the tangentially aligned stem 132 being deflected from its previous centre-line position to a position well to one side of the bore 106, as shown in full lines in FIG. 1. Consequently, the reflector 136 carried on the free end 134 of the stem 132 moves across the inner end 124 of the window element 116, resulting in an easily visible difference to the observer looking through the window element 116. (If the dimensions of the reflector 136 and/or the magnitude of its deflection require clearance greater than the standard of diameter of the bore 106, a circumferential recess 138 can be provided in the bore 106 to accommodate the reflector 136 without collision, as shown in FIG. 1).

The strain indicator 102 is now set up and ready for use, as will now be described.

The stud 102 is employed as a tensile fastener by screw-threading a nut (not shown) onto the external screw thread 140 of the stud 102 near its outer end 108. The nut is screwed down on the item (not shown) to be fastened (eg a pressure vessel closure or a turbine casing), the extreme left end of the stud 102 (omitted from FIG. 1) having been previously anchored in another item (not shown) to which the first said item is to be clamped.

As the nut is tightened on the stud 102 to increase the clamping force, there is a consequential tensile force in the stud 102 with a resultant tendency to stretch the stud 102, causing a tensile strain, ie an increase in the axial length of the stud 102. The bore 106 undergoes a corresponding increase in its length, thus increasing the mutual separation of its opposite ends 110 and 112. The resultant increase in the mutual separation of the opposite ends of the precompressed spring strip 128 reduces the compression of the strip 128 and allows the strip 128 to relax from its relatively highly curved configuration to a relatively more shallow curvature. The tangentially attached stem 132 will track such reduction in the curvature of the strip 128 and so carry the reflector 136 back towards the centre of the inner end 124 of the window element 116.

By suitably relating the material properties (particularly stress/strain relationships) and dimensions of the components of the assembly 100, it can readily be arranged that the precompression of the strip 128 within an unloaded stud 102 produces one visibly distinct indication to an external observer of the reflector 136, and that the relaxation and straightening of the strip 128 consequent upon an elongation of the stud 102 resulting from a correct tightening of the stud 102 produces another visibly distinct indication to the external observer.

Being of a purely mechanical nature with direct optical read-out, the strain indicator 104 is entirely immune to electromagnetic interference. The basic simplicity of the strain indicator 104 is also beneficial in giving high reliability and low cost with a view to protecting internal parts and dampen any potential vibration the longitudinal bore may be filled with fluid, for example, a light oil or other clear corrosion inhibiting fluid.

The assembly 100 described above with reference to FIG. 1 is arranged for on-the-spot observation of the indicated strain where it is desirable or necessary to provide for non-local read-out of strain indications, the modified assembly of FIG. 2 can be adopted, as will now be described.

Referring to FIG. 2, the basic stud/strain indicator assembly 100 is the same as that of FIG. 1 (to the description of which reference should be made for details of the relevant parts of the FIG. 2 assembly). The essential difference in the assembly of FIG. 2 with respect that of FIG. 1 lies in the coupling of an optical fibre 191 (only the near end of which is shown in FIG. 2) to the window element 116 to convey the visible indication provided by the reflector 136 to a selected location remote from the assembly 100.

Referring now to FIG. 3, this shows an extension of the remote monitoring assembly of FIG. 2 to an array of five stud/strain indicator assemblies 100/1–100/5, each optically linked by a respective optical fibre 191–195 to a central strain monitoring unit 196 wherein a suitable transducer array 197 coupled to the optical fibres 191–195 converts and transfers the remote optical readings of the respective strain indicators to a suitable display 198 to provide a central and unitary indication of the tensile states of the five studs. The system of FIG. 3 combines the advantages of the strain indicator arrangement of FIG. 1 with the advantages of remote central monitoring, for example the improved convenience and safety if the studs were at locations to which access was hazardous.

Further variants of the stud/strain indicator assembly will now be described with reference to FIGS. 4–8. (Components shown in FIGS. 4–8 which are analogous to components in FIG. 1 are given analogous reference numerals. Reference should be made to the description of FIG. 1 for any details of FIGS. 4–8 not explicitly stated below).

In the FIG. 4 assembly 400, a spring strip 428 is skewed across the stud bore 406, this skew alignment being brought about by use of a taper-faced inner-end plug 430. The calibrated and/or colour-coded reflector 436 is carried on the middle of the strip 428. The strip 428 is adjustably precompressed by an end screw 418 which also supports an endoscopic viewing tube 424 for accurate observation of the instantaneous strain-indicative position of the reflector 436.

In the FIG. 5 assembly 500, the spring strip 528 has a mid-length carrier 542 in which the reflector 536 is slidably carried and outwardly biased by spring means (not shown) against the wall of the bore 506. The upper face of the carrier 542 has a hole 544 into which is located an end of an optical fibre (not shown) which carries the underlying image of the reflector 536 to an external observer or monitor. The reflector 536 slides transversely under the viewing end of the optical fibre as the spring strip 528 changes its curvature.

In the FIG. 6 assembly 600, the spring strip 628 carries the reflector 636 at the mid-length of the strip 628 thereby to carry the reflector 636 across the viewing end of an optical fibre (not shown) rigidly supported in a side-mounted fibre-carrier 624 depending from the closure assembly 614.

In the FIG. 7 and 8 assemblies 700 and 800 respectively, the respective reflector 736, 836 is carried across the open end of a tubular viewing means 724, 824 (the spring strip being omitted in each instance for clarity).

Figure 11:
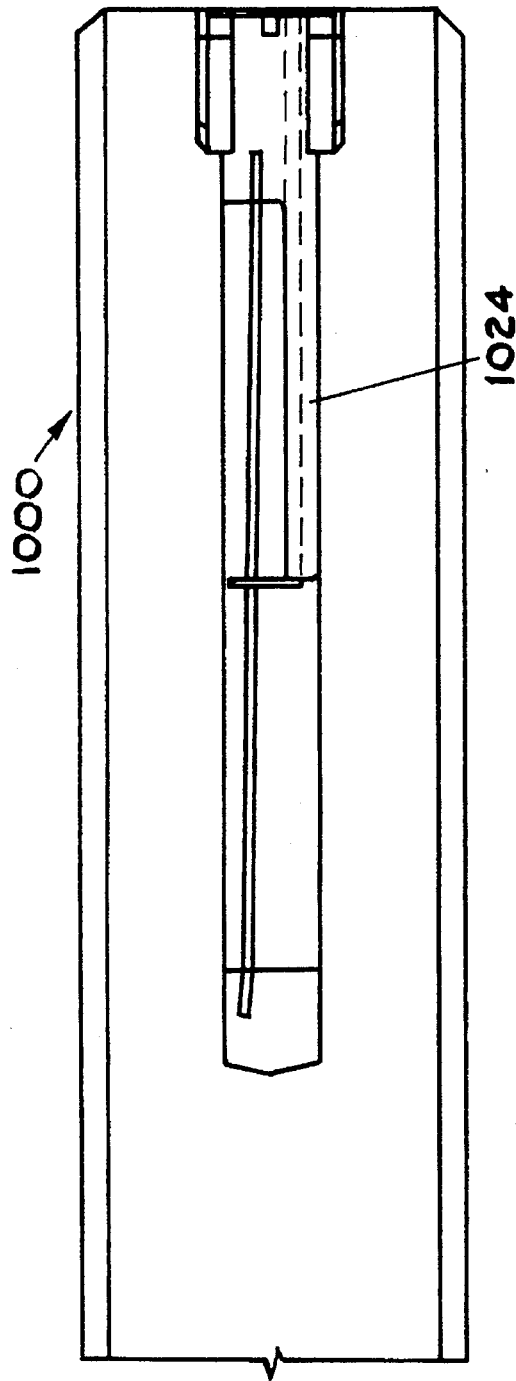
FIG. 11 is a longitudinal sectional elevation of a ninth embodiment of an assembly of a screw-threaded stud and a strain indicator.
Figure 12:
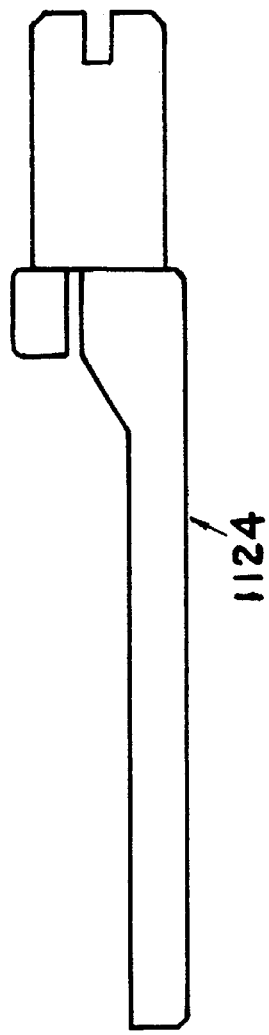
FIGS. 12 and 13 are respectively a longitudinal elevation and a left end elevation, to a much enlarged scale, of a slightly modified version of a component of the assembly of FIG. 11.
Figure 13:
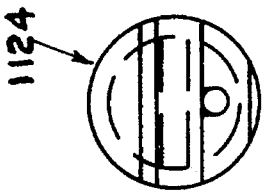

FIGS. 9 and 10 show (to an enlarged scale) details of an assembly 900 similar to that of the assembly 800 (FIG. 8), while FIG. 11 shows (to an enlarged scale) details of an assembly 1000 similar to that of the assembly 600 (FIG. 6), with details of a modified form 1124 of the carrier 1024 (FIG. 11) being illustrated (to a much enlarged scale) in FIGS. 12 and 13.

Figure 14:
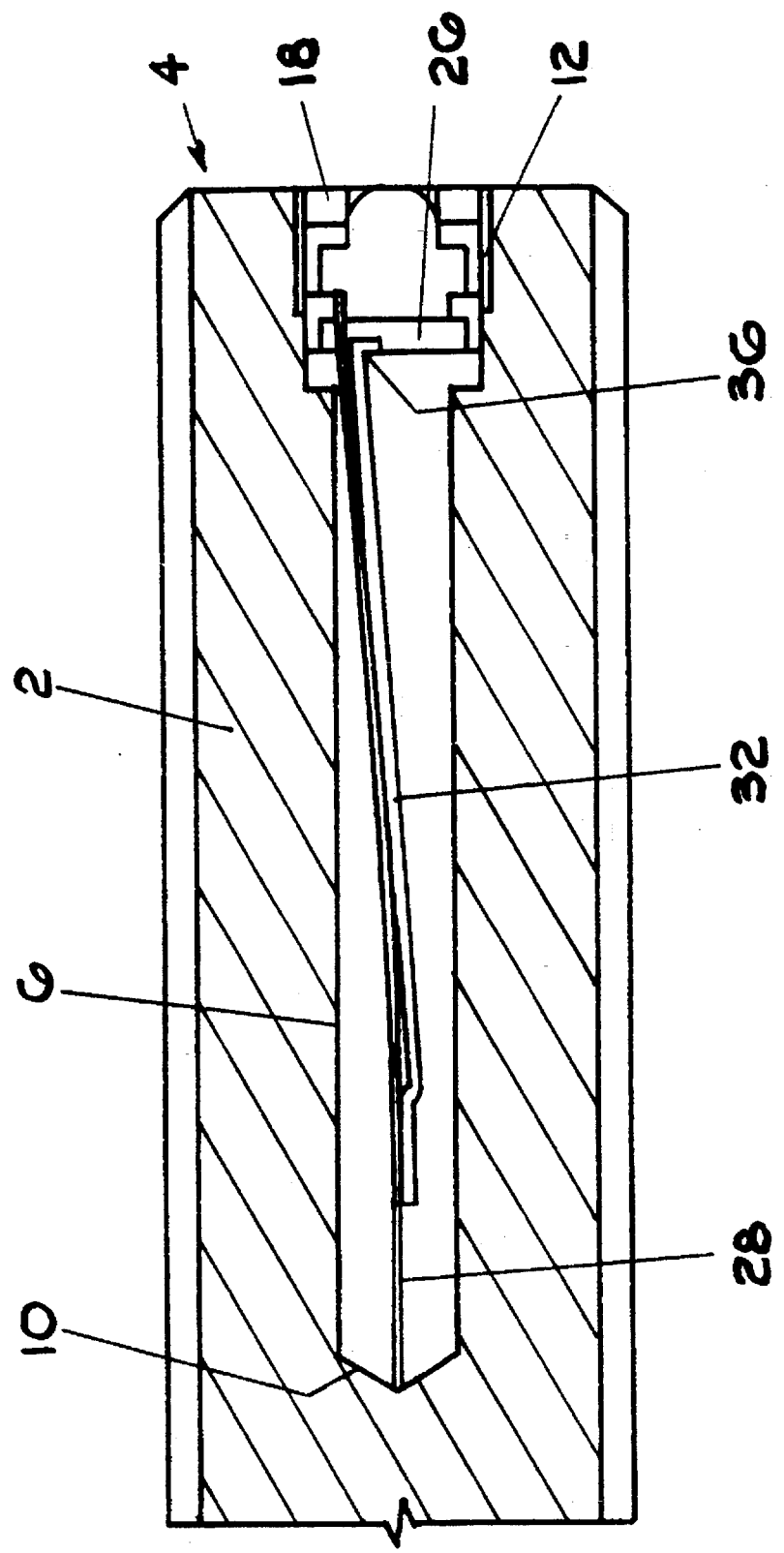
FIG. 14 is a sectional view of yet another embodiment of a strain indicator.

Referring now to FIG. 14 there is illustrated a further embodiment of the present invention.

In this embodiment the strain indicator 4 is mounted within the longitudinal bore 6 of a stud 2. A blind inner end 10 of the bore 6 is formed with a conical surface as would result from a normal drilling technique. The strain indicator 4 comprises an elongate strip 28, the free end of which rests in the conical point of the bland inner end 10 of the bore 6. The other end of the strip 28 is retained in a member 26 in an enlarged portion 12 of the bore 6 and is retained therein by a plug member 18 fitted into the portion 12.

Preferably, the bore 6 and enlarged portion 12 are machined in a single operation. Thereafter the strain indicator 4, already assembled is inserted in the bore 6, the plug 18 being an interference fit within the enlarged portion 12.

In a manner analogous to the embodiment of FIG. 1, a rigid stem 32 is rigidly fixed to the strip 28 such that its free end 36 moves in consequence of compression of the stud. Suitable optical means (such as a mirror) may be fixed to the end 36.

The method of fixing described above, whereby the plug 18 is in interference fit within the enlarged portion 12 facilitates ready calibration of the strain indicator by controlling the extent to which the plug 18 is inserted within the enlarged portion of the bore 12. The operation of this embodiment is similar to that described with reference to the embodiment of FIG. 1.

While certain modifications and variations of the invention have been described above, the invention is not restricted thereto, and other modifications and variations can be adopted without departing from the scope of the invention.

What is claimed is:

1. A strain indicator for incorporation between a first abutment means and a second abutment means to indicate variations in the mutual separation of said first and said second abutment means, said strain indicator comprising an elongate member having opposite ends adapted to be lodged respectively against said first and second abutment means, said elongate member being deformable in a substantially elastic manner by longitudinal compression applied between said opposite ends, at least part of said elongate member being free to move transversely within said strain indicator, said deformation of said elongate member by said longitudinal compression causing a variation in the curvature thereof between said opposite ends, said elongate member carrying optical indicator means which vary in position substantially in accordance with the variation of said curvature of said elongate member whereby variations in the position of said optical indicator means during use of said strain indicator optically indicate variations in the curvature of said elongate member consequent upon variations in the longitudinal compression thereof induced by variations in said mutual separation of said first and second abutment means.

2. A strain indicator as claimed in claim 1, wherein said elongate member is in the form of a strip which has a width which is substantially greater than its thickness whereby to cause said strap preferentially to bend in a plane including said opposite ends and orthogonal to said width.

3. A strain indicator as claimed in claim 2, wherein either or both of said width and said thickness are substantially uniform along the length of said strip.

4. A strain indicator as claimed in claim 2, wherein one or both of said width and said thickness varies in a predetermined manner along the length of said strip.

5. A strain indicator as claimed in claim 1, wherein said strip is formed of tempered steel or other material with the same or similar coefficient of thermal expansion to the fastener/bolt or stud material.

6. A strain indicator as claimed in claim 1, wherein said optical indicator means comprises reflector means which is visibly calibrated and has means of optically distinguishing different parts of said reflector means.

7. A strain indicator as claimed in claim 6, wherein said optical indicator means is mounted directly on said elongate member, and said optical indicator means is mounted on the free end of a cantilever member whose anchored end is anchored to said elongate member to be moved thereby with changing curvature thereof.

8. A strain indicator as claimed in claim 7, wherein said anchored end of said cantilever member is anchored to said elongate member to lie substantially tangential thereto at a region thereof which undergoes maximal change in directional alignment with changes in curvature of said elongate member.

9. A strain indicator as claimed in claim 1, wherein said second abutment means comprises a conical bore.

10. An assembly of an article and a strain indicator, said article comprising a first abutment means and a second abutment means which are mutually spaced apart on said article in a direction thereon which includes at least a component of a load to which the article is subjected in use thereof, which said load strains said article and induces variations in the mutual separation of said first and second abutment means in dependence upon the magnitude of the component of said load acting in said direction, said strain indicator comprising an elongate member and optical indicator means carried thereby, at least part of said elongate member being free to move transversely within said strain indicator, said elongate member having the opposite ends thereof lodged respectively against said first and second abutment means in a manner inducing a longitudinal precompression in said elongate member and a corresponding pre-curvature of said elongate member, whereby an increase in tension or a decrease in compression exerted by said component of said load on said article increases the mutual separation of said first and second abutment means and correspondingly decreases the curvature of said elongate member to cause said optical indicator means optically to indicate such decrease in curvature of said elongate member, and a decrease in tension or an increase in compression exerted by said component of said load on said article decreases the mutual separation of said first and second abutment means and correspondingly increases the curvature of said elongate member to cause said optical indicator means optically to indicate such increase in curvature of said elongate member.

11. An assembly as claimed in claim 10, wherein at least one of said first and second abutment means comprises a controllably variable mounting means which is adapted to mount one end of said elongate member and is operable to apply a controllably variable precompression to said elongate member.

12. As assembly as claimed in claim 11 wherein, said controllably variable mounting means comprises an adjustable clamping screw.

13. An assembly as claimed in claim 12, wherein at least one of said first and second abutment means comprises optical viewing means disposed and arranged to view said optical indicator means.

14. An assembly as claimed in claim 13, wherein said optical indicator means comprises window means constituting a porthole optically linking the interior of said assembly and the exterior of said assembly, said window means being constituted to magnify the view of said optical indicator means.

15. An assembly as claimed in claim 14, wherein said optical viewing means comprises optical image transfer means disposed and arranged to transfer the optical image of said optical indicator means to the exterior of said assembly.

16. An assembly as claimed in claim 15, wherein said optical image transfer means comprises an optical fibre extending from said optical viewing means to a location adjacent said optical indicator means.

17. An assembly as claimed in claim 10, wherein said article is a fastener.

18. An assembly as claimed in claim 17, wherein said fastener is formed with a longitudinal bore extending from one end of said fastener at least part-way along said fastener.

19. An assembly as claimed in claim 18, wherein said longitudinal bore is substantially coaxial with said fastener, and is closed at one end.

20. An assembly as claimed in claim 19, wherein the closed end of said bore constitutes said first abutment means.

21. An assembly as claimed in any one of claims 18 to 20, wherein said second abutment means is constituted by a closure means for the open end of said bore, such closure means comprising an axially mobile mounting for the proximate end of said elongate member, and an externally screw-threaded ring nut turnable in a correspondingly internally threaded end portion of said bore to adjust the longitudinal position of said ring nut, said ring nut normally abutting said axially mobile mounting whereby turning of said ring nut varies the axial position of said mounting and hence varies the precompression of said elongate member of said strain indicator.

22. An assembly as claimed in claim 21, wherein said ring nut centrally mounts a window of transparent glass or transparent acrylic plastics, and is formed with an exterior surface shaped as a magnifying lens.

23. An assembly as claimed in claim 18, wherein said second abutment means comprises a closure means being an interference fit within the open end of said bore.

24. A strain monitoring system for centrally monitoring the respective strains of a spatially distributed plurality of articles each fitted with a respective strain indicator, each said article and its respective strain indicator constituting an assembly in accordance with claim 10, said strain monitoring system comprising a respective optical fibre extending from each said strain indicator to a central strain monitoring means to convey the optical image of the respective optical indicator of each said strain indicator to said central strain monitoring means.

25. An assembly as claimed in claim 17, wherein said fastener is provided with an external screw-thread.

* * * * *

UNITED STATES PATENT AND TRADEMARK OFFICE
CERTIFICATE OF CORRECTION

PATENT NO. : 5,606,132
DATED : February 25, 1997
INVENTOR(S) : Simpson

It is certified that error appears in the above-indentified patent and that said Letters Patent is hereby corrected as shown below:

Column 7, Claim 2, line 59, after "said" delete "strap" and insert --strip--.

Signed and Sealed this

First Day of July, 1997

Attest:

Attesting Officer

BRUCE LEHMAN

Commissioner of Patents and Trademarks